United States Patent [19]

Newton et al.

[11] Patent Number: 4,479,701
[45] Date of Patent: Oct. 30, 1984

[54] DUAL COUPLER FIBER OPTIC RECIRCULATING MEMORY

[75] Inventors: Steven A. Newton, Menlo Park; John E. Bowers, Mountain View; Herbert J. Shaw, Stanford, all of Calif.

[73] Assignee: Leland Stanford Junior University, Stanford, Calif.

[21] Appl. No.: 326,215

[22] Filed: Dec. 1, 1981

[51] Int. Cl.³ .............................................. G02B 5/172
[52] U.S. Cl. .................................. 350/96.16; 455/610; 455/612
[58] Field of Search ...................... 250/227; 350/96.15, 350/96.16; 455/610, 612

[56] References Cited

U.S. PATENT DOCUMENTS

| 4,136,929 | 1/1979 | Suzaki | 350/96.15 |
| 4,159,418 | 6/1979 | Marom | 350/96.15 X |
| 4,307,933 | 12/1981 | Palmer et al. | 350/96.16 |
| 4,317,614 | 3/1982 | Palmer | 350/96.16 |

FOREIGN PATENT DOCUMENTS 11432 2/1981 Japan .................. 350/96.16

OTHER PUBLICATIONS

Bergh et al., *Electronics Letters*, vol. 16, No. 7, Mar. 27, 1980, "Single-Mode Fibre Optic Directional Coupler", pp. 260-261.

*Primary Examiner*—William L. Sikes
*Assistant Examiner*—Frank González
*Attorney, Agent, or Firm*—Knobbe, Martens, Olson & Bear

[57] ABSTRACT

A fiber optic recirculating memory is disclosed which utilizes dual couplers to form a splice-free recirculating memory device from a length of single mode optical fiber forming a loop which acts as a delay line and a second length of single mode optical fiber which provides an input end and an output end for the device. A single signal supplied as an input to the device will result in a series of output signals identical to the input signal, although at smaller, decreasing amplitudes; the invention prevents the first output signal from being substantially larger than the rest of the output signals, thus eliminating the need for protective circuitry on the output end or the rejection of the first output signal. In addition to being useful as a recirculating memory device for use in a system where data is generated at a rate faster than it can be accepted by a data processor, the invention may be used as a tap filter to pass a selected fundamental frequency and its harmonics, and to attenuate all other frequencies.

31 Claims, 10 Drawing Figures

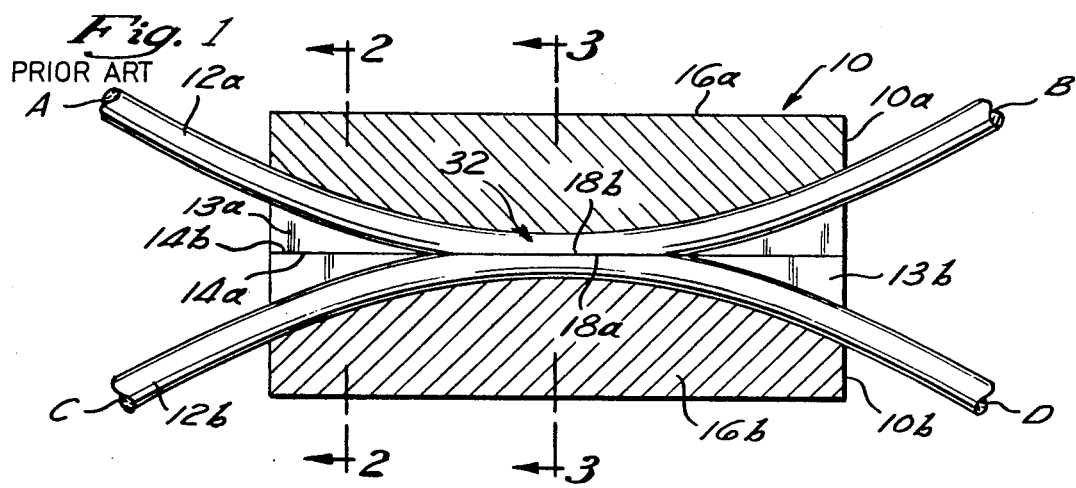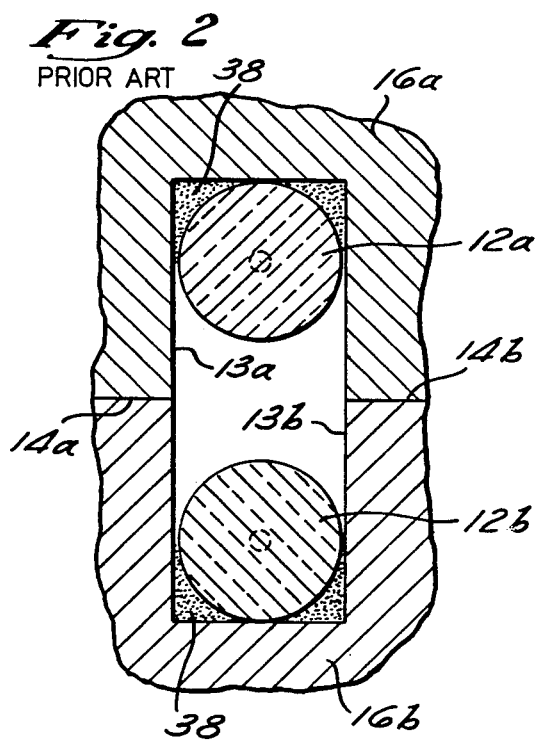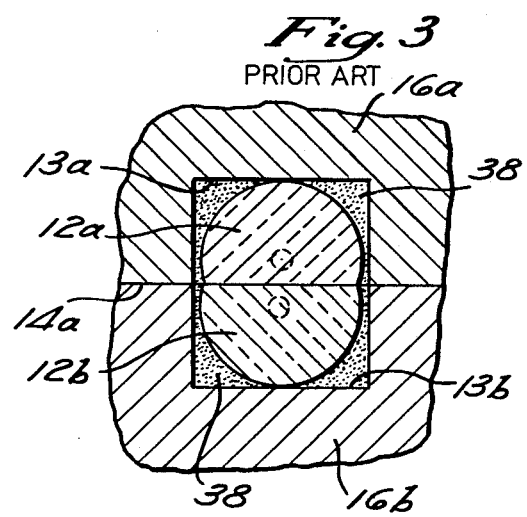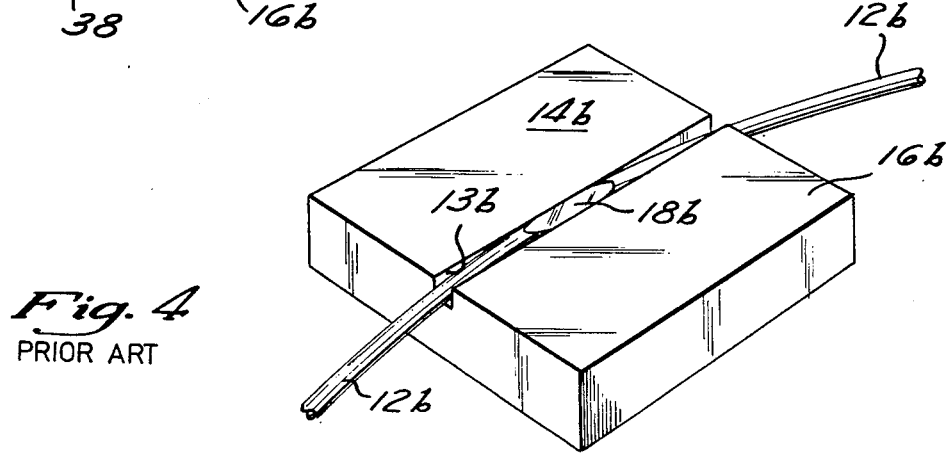

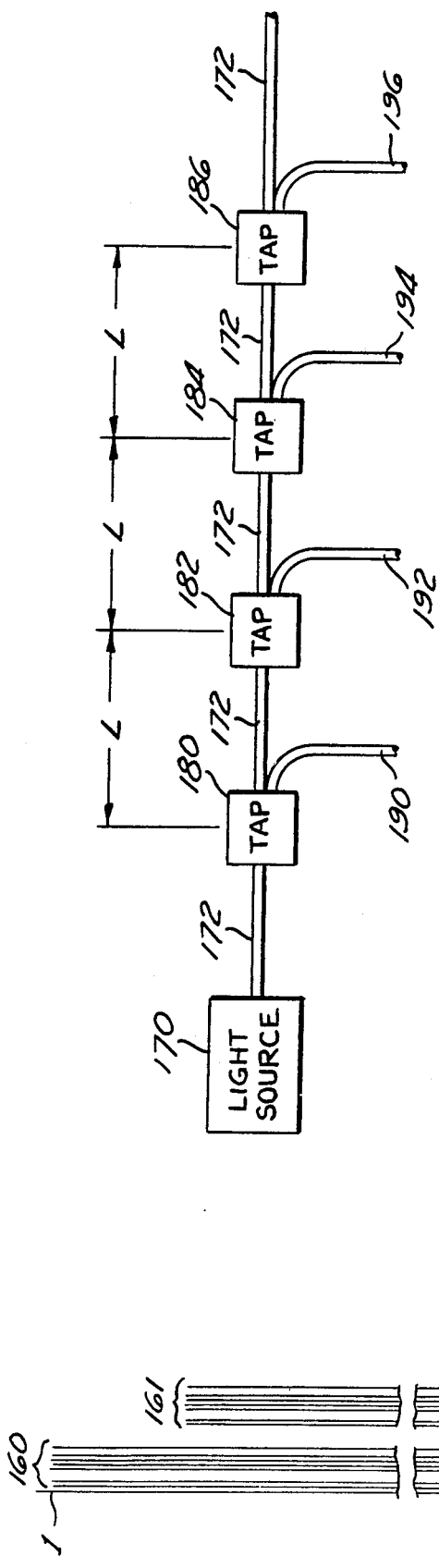
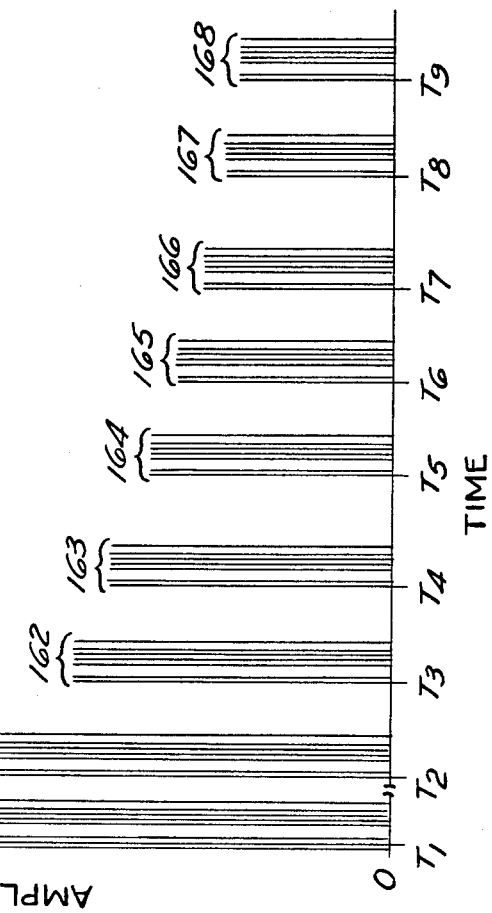

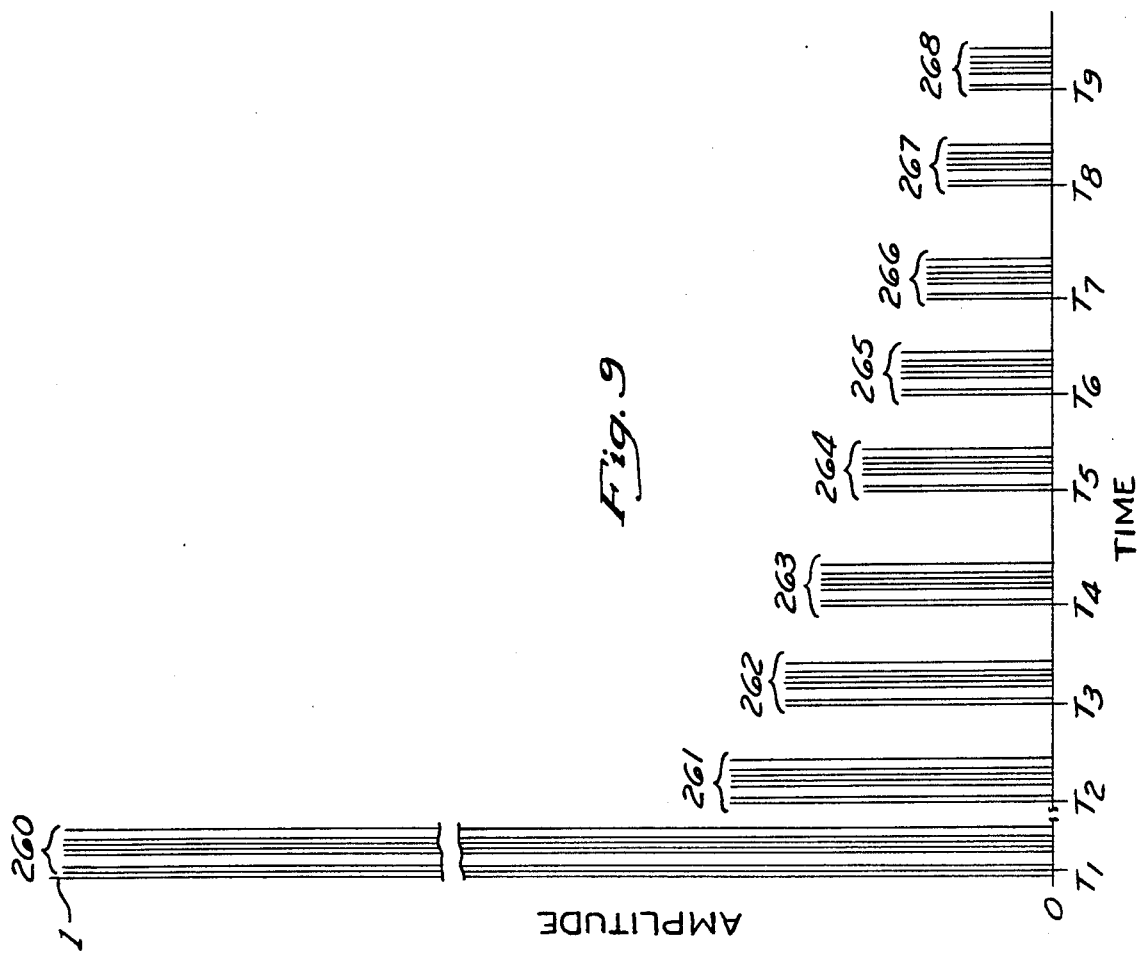

DUAL COUPLER FIBER OPTIC RECIRCULATING MEMORY

BACKGROUND OF THE INVENTION

In a recirculating memory, data is injected into a closed loop at a high rate, and recirculates around the loop in a continuous unidirectional motion. The entire group of data stored in the loop may be repeatedly read from the loop at a period equal to the time taken for the data to complete one cycle around the loop. In this way, a group of data may be stored in the recirculating memory, and the data may be read from the memory at a slower rate since the data will continue to circulate in the loop for some extended period of time, thus allowing different portions of the data to be sampled after each circulation.

Such systems are quite useful in applications where data is generated at a rate faster than it can be accepted by a data procesor. By installing a recirculating memory between the data source and the data processor, the data can be supplied to the data processor at the rate necessary for the data processor to analyze the data without loosing any of it. Another use of recirculating memory devices is for the temporary storage and retrieval of broadband microwave signals in electronic counter-measures (ECM) used to jam radar signals or to project false radar images.

Many of these systems use coaxial cables or acoustic wave guides rather than using a loop for the storage of signals modulated onto the microwave carriers. Such devices are basically delay lines in which a time delay is produced because of the time a signal takes to travel through the delay lines from the input end to the output end. In addition to the direct output of a given input signal, a portion of that signal will be reflected and will propagate from the output end back to the input end, where it is reflected to the output end again, resulting in a second output signal identical to the first output signal, although smaller in amplitude. The data pulse will continue to be reflected and outputted from the delay lines for some period of time, resulting in a number of identical pulses, equidistantly spaced, with decreasing amplitude.

The coaxial cable delay line is the most common type of delay line, and microwave signals may be stored in coaxial cables for some period of time. Coaxial cable may be used with directional couplers, which couple a secondary system to a wave traveling in a particular direction in the primary transmission system. When used as a recirculating memory, however, coaxial delay lines have several disadvantages. The first disadvantage is the limited bandwidth of coaxial cable, making coaxial cables useless at high frequencies and with short pulses.

At frequencies above 100 MHZ, coaxial cable is subject to severe losses, and high frequencies will thus not be transmitted accurately. In addition, if the pulse being transmitted is of extremely short duration, e.g., one nanosecond, it will be degraded and spread out rather than remaining sharp. This limits the number of pulses which can be transmitted close together, and, consequently, the information-carrying capability of the coaxial cable.

A second disadvantage of coaxial cable is that it is susceptible to electromagnetic interference, particularly when the frequencies being transmitted are relatively high. Finally, in order to have a coaxial cable delay line with a sufficiently long delay time, a considerable length of coaxial cable is necessary. Such delay lines are quite bulky, and also fairly expensive.

A second technique utilized to create delay lines and recirculating memories is through the use of acoustic delay lines. There are two types of acoustic delay lines: bulk-wave devices, and surface-wave devices. Bulk-wave devices use the principle of compression and rarification of the bulk material, and have input and output transducers at the ends of the bulk material. Bulk-wave devices unfortunately require large bias voltage and thus present a heat dissipation problem, so that only pulsed operation of bulk-wave devices is feasible.

Surface-wave devices operate with acoustic surface waves, and utilize charge carriers in a thin film of silicon placed adjacent to an insulating piezoelectric crystal. Surface acoustic wave memories operating at UHF frequencies have been developed. The main disadvantage of such acoustic wave memories is that their upper operational frequency limit is approximately 1 GHZ, while it is desirable to have a recirculating memory operable at higher frequencies.

Attempts to develop a fiber optic recirculating memory have been unsuccessful, in part because of the lack of an optical directional coupler. One attempt to create such a system is disclosed in U.S. Pat. No. 4,136,929, to Suzaki, entitled "Apparatus for Generating Light Pulse Train." The object of this invention was to produce a pulse train with identical pulses as an output, with a single pulse as the input to the system. The most interesting embodiment of this invention is shown in FIG. 1A, which has a fiber running through a coupling device with the ends of this fiber being the input and output, and a loop fiber also running through the coupler device and being optically coupled with the input-output fiber.

This concept is rendered impractical by the fact that it is not possible to manufacture a single continuous fiber loop, which must be used as the recirculating delay line. The only way the invention of the Suzaki patent could be implemented is to splice a length of glass fiber to produce the loop. Whenever a splice is necessary, there are considerable losses in the light being transmitted through the fiber due to the splice. Therefore, any device embodying a spliced fiber is, and must be, an inefficient device.

A second problem with the Suzaki apparatus is that it does not utilize evanescent field coupling in the coupling device utilized. The coupling device utilized requires that the glass fibers be cut and polished until the cores of the fibers are exposed to create an optical couple between the fibers. This presents the possibility that the core of the fiber may be damaged in the process, further lowering the efficiency of the Suzaki device. In addition, since the evanescent fields are not coupled, the coupling loss, which is the difference between the amount of light going into the coupler and the amount of light coming out of the coupler, may be significant.

Finally, the Suzaki device utilizes multi-mode fibers rather than single mode fibers. Multi-mode fibers have a much larger core diameter than do single mode fibers. Since multi-mode fibers have a larger core, the angle of refraction is greater, and thus multi-mode fibers are quite susceptible to modal dispersion, which will limit the bandwidth to 500 MHZ to 1 GHZ. Even when using a graded index multi-mode fiber, where dispersion is minimized by grading of the index of refraction, maximum band width of signals to be transmitted is only slightly above 1 GHZ. The exact bandwidth, of course, will depend on the frequency of the light, since light of a given wavelength may have minimal dispersion due to properties of the optical fiber.

Single mode fiber does not have modal dispersion problems, since the diameter of the single mode fiber core is relatively small. While any optical fiber will have some material dispersion, the effects of material dispersion are several orders of magnitude less than those of modal dispersion.

Therefore, the Suzaki device possesses the diadvantages of having a limited bandwidth, and of having relatively high losses, which impede the transmission of a pulse train of any length. For these reasons, the Suzaki device is not useful as a recirculating memory device with a high frequency data input.

SUMMARY OF THE INVENTION

The invention is a recirculating memory utilizing dual couplers with single mode optical fiber in a splice-free configuration. The delay line is comprised of a coil of the optical fiber, with the two ends of the coil coupled by dual directional fiber optic couplers to a second length of single mode optical fiber having two ends, one end being the system input and the other end being the system output. The fiber optic couplers used, along with the method for manufacturing them, are described in detail in co-pending patent application Ser. No. 300,955, filed Sept. 10, 1981, entitled "Fiber Optic Directional Coupler," and assigned to the assignee of the present invention. That co-pending patent application is hereby incorporated herein by reference.

The couplers are fabricated so that the system input end of the second length of optical fiber enters and exits the first coupler, and then enters and exits the second coupler. The end of the second length of optical fiber exiting the second coupler is the system output end of the fiber. The input end of the loop fiber enters the second coupler through the same side of the second coupler the system output end of the second fiber exits from, and terminates at the opposite side of the second coupler. The output end of the loop fiber enters the first coupler through the same side the input end of the second fiber does, and terminates at the opposite side of the first coupler. Therefore, when a high frequency light signal is supplied to the device, it will enter the loop from the input end of the second length of optical fiber through the second coupler and will be recirculated in the loop to provide periodic outputs. The outputs of the device will be serial repetitions of the input signal, with decreasing amplitude.

This device possesses several advantages over the other devices described above. The most important advantage, and one which is held over coaxial cable devices, acoustic devices, and the device of the Suzaki patent, is that the invention will function at very high frequencies. Since the optical frequencies may be of the order of $10^{14}$ Hz, frequencies several orders of magnitude higher than one GHz may be modulated onto the optical carrier frequencies used. In this way, numerous rapid pulses occurring in a short period of time may be stored in the recirculating memory and supplied to the data processor at a slower rate.

The present invention has several other advantages over coaxial cable devices. There are comparatively minimal losses with the present invention, even at high system frequencies, and pulses of very short duration will not be significantly degraded since the system is using single mode fiber optics. Another advantage is that fiber optics are not susceptible to electro-magnetic interference. Finally, a single mode fiber optic line providing the same delay time of a bulky coaxial cable is fairly compact, since single mode optical fibers have a much smaller diameter than does coaxial cable.

The present invention has the advantage of being operational at a much higher frequency than devices utilizing acoustic wave delay techniques. In addition, fiber optic devices operate at fairly low power levels, thus eliminating the heat dissipation problems of bulk-wave devices.

The advantages of the present invention over the Suzaki device are that the present device is splice-free, utilizes single-mode fibers, and uses evanescent field coupling. Since the device embodying the present invention is splice-free, and therefore has lower losses, the series of pulses will be of a higher amplitude and will diminish at a slower rate than will pulses obtained by the Suzaki device. This allows more circulations of the light in the loop, and thus a longer memory. Since single mode fiber is used, the present invention allows pulses of shorter duration and high repetition rates to be transmitted. Finally, since evanescent field coupling is utilized, the present invention provides a more efficient, stable, and controllable coupling of the optical fibers, and thus a greater degree of control over the characteristics of the signal output from the device.

These and other advantages of the present invention are best understood through reference to the drawings, in which:

FIGS. 1 through 4 are identical to the FIGS. 1 through 4 in the copending patent application described above which is incorporated herein by reference. These figures include:

FIG. 1 is a cross-sectional view of the fiber optic coupler used in the present invention;

Figure 5:
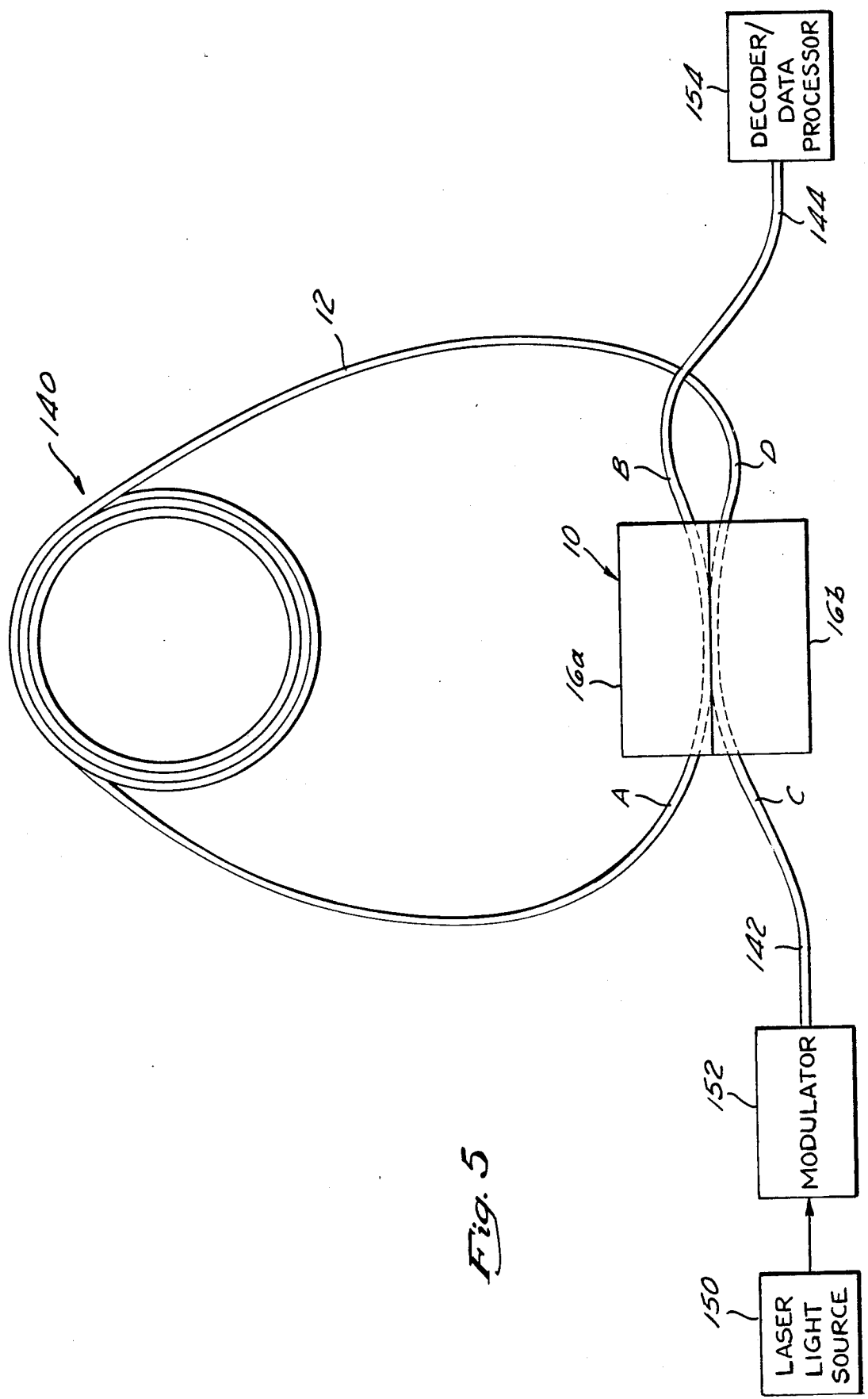
Figure 8:
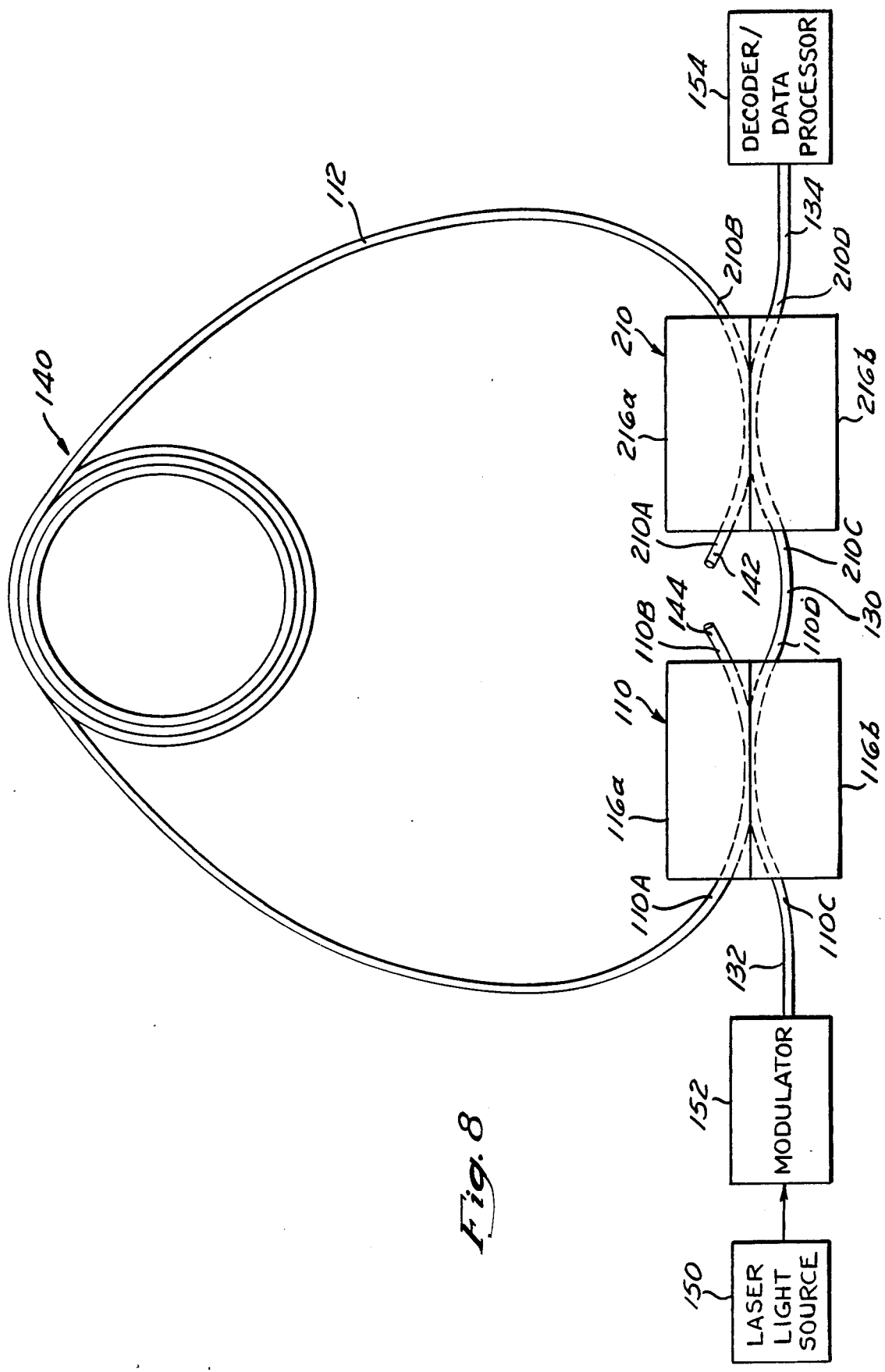

FIGS. 2 and 3 are cross-sectional views of the coupler of FIG. 1, taken along the lines 2—2 and 3—3, respectively;

FIG. 4 is a perspective view of one element of the coupler of FIG. 1, separated from the other element thereof, to show the configuration of the confronting face of said element;

FIG. 5 shows a recirculating memory device incorporating the optical coupler of FIG. 1;

FIG. 6 is an amplitude v. time plot of the device of FIG. 5, including a single input signal, and the initial signals of the resulting series of output signals from that device;

FIG. 7 shows a simple optical tap delay line which may be used as a transversal filter;

FIG. 8 shows the recirculating memory device of the present invention, also incorporating the optical coupler of FIG. 1;

FIG. 9 is the amplitude v. time plot of the device of FIG. 8, including the same input signal as in FIG. 6, and the resulting series of output signals from the device of FIG. 8; and FIG. 10 is a chart showing the optimum coupling coefficients and maximum number of useable outputs for variable loop losses of the devices of FIGS. 5 and 8.

DETAILED DESCRIPTION OF THE PREFERRED EMBODIMENT

Referring initially to FIGS. 1 through 4, a fiber optic directional optic coupler which may be used to form a recirculating loop memory is shown. This fiber optic coupler, along with a method for its manufacture, is described in detail in the co-pending patent application incorporated by reference above. A brief description of FIGS. 1 through 4 will be provided to permit an understanding of the essential characteristics of the fiber optic coupler.

The coupler 10 includes two strands, 12A and 12B, of a single mode fiber optic material mounted in longitudinal arcuate grooves 13A and 13B, respectively, formed in optically flat confronting surfaces 14A and 14B, respectively, of rectangular bases or substrates 16A and 16B, respectively.

Each of the strands 12A and 12B comprises a commercially available fiber of quartz glass which is doped to have a central core and an outer cladding. The applicant has found that the present invention works effectively with single mode fibers, which typically have a core diameter in the order of 10 microns or less, and a cladding diameter on the order of 125 microns.

The arcuate grooves 13A and 13B have a radius of curvature which is very large compared to the diameters of the strands 12. Thus the fiber optic strands 12A and 12B, when mounted in the grooves 13A and 13B, respectively, gradually converge toward the center and diverge toward the edges of the substrates 16A and 16B. At the centers of the substrates 16, the depth of the grooves 13 which mount strands 12 is less than the diameter of the strands 12, while at the edges of the blocks 16, the depth of the grooves 13 is preferably at least as great as the diameter of the strands 12. Fiber optic material is removed from each of the strands 12A and 12B to form respective oval shaped, planar surfaces 18A, 18B which are co-planar with the confronting surfaces 14A, 14B, respectively, of the substrates 16A and 16B, respectively. In the embodiment shown, the coupler halves 10A and 10B are identical and are assembled by placing the confronting surfaces 14A and 14B of the substrates 16A and 16B together so that the surfaces 18A and 18B of the strands 12A and 12B are in facing relationship. An index matching substance (not shown), such as index matching oil, is provided between the confronting surfaces 14. This substance has a refractive index approximately equal to the refractive index of the cladding and also functions to prevent the optically flat surfaces 14 from becoming permanently locked together.

An interaction region 32 is formed at the junction of the strands 12. In this region 32 light is transferred between the strands 12a, 12b by evanescent field coupling. Furthermore, as explained in the above referenced copending patent application, when the spacing between the cores of the strands 12 is within a critical zone, each strand receives a significant portion of the evanescent field energy from the other strand and optimum coupling is achieved without significant energy loss. For a single mode fiber having a step index gradient, the critical zone can be quite narrow. In a single mode fiber of the type shown in FIGS. 1 through 4, for example, the required center-to-center spacing between the strands 12 at the center of the coupler is typically less than a few (for example, 2-3) core diameters.

Preferably the strands 12A and 12B are symmetrical through the interaction region 32 in the plane of the facing surfaces 18 so that the facing surfaces 18a and 18b are coextensive if superimposed.

The coupler 10 includes four ports labeled A, B, C and D in FIG. 1. If it is assumed that input light of a suitable wavelength (for example, 1.15 microns) is applied to port A, this light passes through the coupler and is output at port B and/or port D, depending on the amount of power that is coupled between the strands 12. In this regard, the term "normalized coupled power" is defined as the power ratio of the coupled power to the total output power. In the above example, the normalized coupled power would be equal to the ratio of the power at port D to the sum of the power output at ports B and D. This ratio is also referred to as the "coupling efficiency" and when so used is typically expressed as a percent. Thus, when the term "normalized coupled power" is used herein, it should be understood that the corresponding "coupling efficiency" is equal to the normalized coupled power times 100.

The coupler 10 operates an evanescent field coupling principles in which guided modes of the strands 12 interact through their evanescent fields to cause light to be transferred between the strands 12. As previously indicated, this transfer of light occurs at the interaction region 32. The amount of light transferred is dependent upon the proximity and orientation of the cores as well as the effective length of the interaction region 32. If the length of the interaction region 32 and the separation of the strands 12 within this region 32 are properly selected, light within the coupler will make only one transfer between the strands 12 as it travels through the interaction region 32. If the coupler is properly constructed, it is possible under such conditions to couple 100% of the light input at port A to port D. If the length of the interaction region 32 is further increased, or the separation between the strands 12 further reduced, a phenomenon referred to herein as "overcoupling" will occur in which the light will transfer back to the strand from which it originated. Several orders of "overcoupling" are possible. Thus, as the interaction length is still further increased or the separation is still further reduced, the light will make several transfers between the strands. This phenomenon is explained in detail in the incorporated copending application. Thus, the light may make multiple transfers back and forth between the two strands 12 as it travels through the region 32, the number of such transfers being dependent on the length of interaction region 32 and the spacing of the strands 12 within this region.

Referring now to FIGS. 5 and 6, the incorporation of the fiber optic coupler 10 into a splice-free fiber optic recirculating memory device is shown. This device is described in detail and is claimed in co-pending patent application Ser. No. 314,473, filed Oct. 23, 1981, entitled "Splice-Free Fiber Optic Recirculating Memory," and is assigned to the assignee of the present invention. A brief description of this device follows.

A single continuous length of optical fiber 12 is used. The input end 142 of the fiber 12 enters the optical coupler 10 through port C, and exits the coupler 10 from port D. After the fiber 12 exits the coupler 10 from port D, a length of the fiber 12, for example 200 meters, is formed into a loop 140. The fiber 12 then leaves the loop 140 and enters the coupler 10 through port A, and exits from port B. The end of the fiber 12 which exits the coupler 10 through port B is the output end 144 of the fiber 12.

An input signal 160 of modulated light pulses shown in FIG. 6 is supplied to the input end 142 of the optical fiber 12 at time $T_1$, from a laser light source 150 and a modulator 152. This light will enter the optical coupler 10 through port C. Assuming a typical coupling efficiency of 95%, 95% of the light will be coupled to the port B. Light exiting the coupler from port B leaves the optical fiber 12 through the fiber exit 144 at time $T_2$ which is an instant after $T_1$, and this is the first output signal 161 of a series of output signals supplied to a decoder/data processor 154. It is important to note that the first output signal 161 is at a level approximately 95% of the level of the input signal 160; thus, all succeeding output signals must be generated by the 5% of the input signal 160 directed into the recirculating loop. All output signals after the first will be relatively small, and this large difference in the size of output pulses supplied by the system may lead to a problem in the construction of a suitable decoder/data processor 154, as will be discussed later.

The remaining 5% of the original input signal 160 which is not coupled exits the coupler 10 through port D, and continuous through the optical fiber 12 into loop 140, which acts as a delay line. After some period of time, which is directly proportional to the length of the fiber 12 in the loop 140, the light will leave the loop 140. The light will then enter the coupler 10 through port A, and 95% of the light will be coupled to port D, to recirculate into the loop 140. The 5% of the light which is not coupled will leave the coupler 10 through port B. This line will be output from the fiber 12 through the fiber exit 144, as the second signal 162 of the series of signals at time $T_3$. After the first output signal 161 at time $T_2$, the successive output signals occur periodically. Thus, it may be seen that the second output signal 162 is an exact reproduction of the first signal 161 that was output, although at reduced amplitude, and both are identical to the input signal 160, but at a lower amplitude.

Each time the light circles the loop 140, 95% of the light will be recirculated back into the loop 140, and 5% of the light will be output from the device. Thus, for any input signal, a series of output signals identical to the input signal but with decreasing amplitude will be supplied from the device. The first output signal 161 is fairly large, and it is followed by a series of smaller output signals which decrease in amplitude exponentially.

When the coupling coefficient is 95%, the first output signal 161 will be at least 380 times as large as the second output signal 162. This leads to a significant problem in that the decoder/data processor 154 must be able to accept the relatively large first output signal 161, and yet still be able to accurately process the successive series of smaller output signals accurately. To allow the decoder/data processor 154 to accept the first output signal 161, typically the accuracy in processing the successive smaller signals will be adversely affected. The alternative is to add some type of protection circuitry to the decoder/data processor 154 which will cause the first output signal 161 to be rejected entirely rather than being supplied to the data processing circuitry. Thus, it can be seen that under such circumstances the first useable output signal would be the second output signal 162. It is therefore desirable that an improved device perform with substantially the same characteristics as the device of FIG. 5, but greatly diminish the amplitude of the first output signal.

Such a device is the subject of the present application, and is shown in FIG. 8. For this application, two lengths of optical fiber are used, a fiber 112 which forms the loop 140, and a second fiber 130 which provides an input end 132 and an output end 134 for the system. Two optical couplers 110 and 210 are used, and these couplers are identical to the coupler 10 shown in FIG. 1. The input end 132 of the fiber 130 enters the first optical coupler 110 through port 110C and exits the coupler 110 from port 110D. The fiber 130 then enters the second coupler 210 through port 210C and exits the coupler 210 from port 210D, at the output end 134 of the fiber 130.

The first fiber 112, which is a loop of some length to provide a delay line, has a first end 142 entering the second coupler 210 through port 210A, and exiting the coupler 210 from port 210B. This end of the fiber 112 is the light input to the loop 140. After leaving the loop 140, the fiber 112 then enters the first coupler 110 through port 110A and exits the coupler 110 through port 110B at the other end 144 of the fiber 112.

The operation of this dual coupler recirculating memory device will now be described. The optimum coefficient of coupling $1_1$ of the first coupler 10 and $1_2$ of the second coupler 210 to provide a maximum number of recirculations, is dependent upon two variables in the system. The first of these is the ratio of the minimum detectable output power level $P_T$ to the level of power input to the system $P_O$. This ratio $P_T/P_O$ is typically about $1 \times 10^{-4}$, and the following calculations are made using this value for $P_T/P_O$.

The second variable is the percentage of power transmitted K by the loop 140, which is the amount of power input less losses in the glass fiber medium. Generally, the coefficients of coupling $1_1$ and $1_2$ will vary in direct proportion to the percentage of power transmitted K by the loop 140, as will be seen below. The formula for calculating the number of useable recirculating outputs n is as follows:

$$n = \frac{\ln \frac{P_T}{P_O} - \ln [(1 - l_1) \cdot (1 - l_2)]}{\ln (K \cdot l_1 \cdot l_2)} \qquad (1)$$

Because of the characteristics of the couplers, $1_1$ and $1_2$ must be equivalent in order to attain maximum efficiency. By using the formula, if the percentage of power transmitted by the loop 140 is 100% (K=1.), the optimal coupling coefficients $1_1$ and $1_2$ are 0.973 to attain the maximum number of useable output signals (which must by definition be at least $1 \times 10^{-4}$ of the input level). If 90% of the power is transmitted by the loop (K=0.9), the optimum coupling coefficient is 0.94. A list of the optimum coupling coefficients and maximum number of recirculations for different percentages of power transmitted K by the loop 140 for both the present invention and for the recirculating memory shown in FIG. 5 are shown in the chart of FIG. 10.

A typical loop 140 could be a 200 meter length of glass fiber and if the loss of the fiber is about one db per kilometer, the optimum coupling coefficient is about 0.9575. For convenience, the figure 0.96 will be used below in describing the operation of the recirculating memory device. An input signal 260 of modulated light pulses shown in FIG. 9 (and identical to the input signal 160 shown in FIG. 6) is supplied to the input end 132 of the optical fiber 130 at time $T_1$, from a laser light source 150 and a modulator 152. This light will enter the first optical coupler 110 through port 110C. Since the coupling efficiency is 96%, 96% of the light will be coupled through the port 110B and lost through the other end 144 of the fiber 112. The remaining 4% of the original input signal 160, which is not coupled, exits the first coupler 110 through port 110D, and continues through the optical fiber 130 into the second coupler 210 through port 210C. Since the coupling coefficiency of the second coupler 210 is also 96%, 96% of the remaining 4% of the original input signal 160 will be coupled and exit the second coupler 210 via port 210B, entering through the optical fiber 112 into the loop 140, which acts as a delay line. The light not coupled in the second coupler 210 exits through the port 210D through the fiber exit 134, and will be at a power level of 0.0016 of the original input signal 260. This first output signal 261, as shown in FIG. 9, exits at time $T_2$, which is an instant after $T_1$, and is the first output signal 261 of a series of output signals supplied to the decoder/data processor 154.

After some period of time, which is directly proportional to the length of the fiber 112 in the loop 140, the light coupled into the loop 140 will leave the loop 140. This light will then enter the first coupler 110 through port 110A, where 96% of it will be coupled to port 110D. This light will enter the second coupler 210 through port 210C, where 96% of it will be coupled back into the loop 140 and the 4% which is not coupled will leave the coupler 210 through port 210B. This light will be output from the fiber 130 through the fiber exit 134, as the second signal 262 of the series of signals at time $T_3$. After the first output signal 261 at time $T_2$, the successive output signals occur periodically. Thus, it may be seen that the second output signal 262 is an exact reproduction of the first signal 261 that was output, although at reduced amplitude, and they both are identical to the input signal 260, but at a lower amplitude.

As a note of comparison, the first output signal 261 of FIG. 9 is at a useable level, unlike the first output signal 161 of FIG. 6. Thus, it may be seen that the dual coupler fiber optic recirculating memory of the present invention provides a first output signal 261 which is at a useable level, eliminating the need for protective circuitry in the decoder/data processor 154.

Each time the light circles the loop 140, 92.16% of the light will be recirculated back into the loop 140, and 3.84% of the light will be output from the device. About 4% of the light is lost when it exits the other end 144 of the fiber 112, making the output signals shown in FIG. 9 decrease at a slightly faster rate than do the output signals of FIG. 6. Thus, it may be seen that in order to obtain a series of output pulses all at a useable level, and to prevent the first output pulse from being of a proportionately extremely high level, the trade-off required by the present invention is to reduce the efficiency of operation by about 4%-this decrease in efficiency caused by the light exiting through the end 144 of fiber 112. For any input signal, a series of output signals identical to the input signal but with decreasing amplitude will be supplied from the device.

While the successive output signals may differ somewhat in pulse shape due to dispersion, they will be substantially identical, and they will be separated to provide adequate resolution of consecutive output signals as long as the duration of the input signal 260 supplied to the device is sufficiently shorter than the delay time provided by the loop 140 to compensate for dispersion. Thus, it can be seen that a signal may be modulated onto the light input to the device, and a series of decreasing amplitude output pulses will be periodically provided to the decoder/data processor 154, the length of the period proportional to the length of the fiber 112 in the loop 140.

This feature makes the system highly useful as a recirculating memory device supplying data to a processor, since the series of identical output signals allows the data processor to sample different portions of the data upon successive circulations. In this way, a data processor operating at a slower rate than the device generating the data may be used by utilizing the recirculating memory.

In FIG. 9, for example, during the first output signal 261, the first data bit may be read by the data processor. During the second series 262, the second bit may be read. During the third series 263, the third bit may be read, and so on.

The device shown in FIG. 8 may also be used as a tap delay line transversal filter to pass some frequencies and reject others. A basic optical tap delay line is shown in FIG. 7. A light source 170 injects light into an optical fiber 172. This optical fiber 172 has four taps 180, 182, 184, 186 installed along its length, with the taps 180, 182, 184, 186 being separated by equal lengths L of the optical fiber 172. The taps 180, 182, 184, 186 will each couple a portion of the light traveling in the fiber 172 to their outputs, which are, respectively, outputs 190, 192, 194, 196.

If the light source 170 provides an input signal which varies as some function of time, the optical tap may be used to filter selected frequencies from the input signal. Thus, by summing the outputs 190, 192, 194, 196, the device may be used to attenuate any input signal content other than a selected fundamental frequency or that fundamental frequency's harmonics. Thus, by making the length L of the fiber 172 between the taps 180, 182, 184, 186 that length which will provide a delay time equal to the period of this fundamental frequency, the device will filter an input light signal to attenuate all other frequencies, providing at the summed output a signal comprising the fundamental and harmonic frequency content of the input signal.

The recirculating loop device disclosed here may be used as a transversal filter by providing an input signal from the laser light source 150 and the modulator 152 which varies as some function of time. The period of the fundamental frequency may be set by selecting the length of the fiber 12 in the loop 140 so that its delay time will be equivalent to the period of the fundamental frequency desired. That portion of the input signal corresponding to the fundamental frequency and the harmonics of that frequency will then be passed from the fiber exit 134 to the decoder/data processor 154, but other frequencies will be attenuated, since they do not constructively add at the couplers 110 and 210, and thus the device may be used to indicate the presence or absence of the fundamental frequency and its harmonics.

The advantages of this device over the Suzaki device are fairly impressive. There are no longer any losses caused by the necessity of having a splice in the loop. Since the presence of a splice causes great losses, the limitation of the Suzaki device is that only a relatively small number of output pulses may be obtained. The device of the present invention, on the other hand, has no loss due to the presence of a splice, and therefore is able to provide a greater number of output pulses of a usable amplitude. This allows a greater difference between processing speed and input speed.

The second advantage the device of the present invention has over the Suzaki reference is that much higher frequencies may be used, since single mode optical fiber is used rather than the multi-mode fiber of the Suzaki device. This advantage, of course, is also a signuficant advantage over the coaxial cable and acoustic devices described above. The higher frequencies and lower losses of the device disclosed here enable a recirculating memory device to be used in a system which generates data at such a high rate that a conventional data processor cannot handle it. The accurate transmission of such data is now made possible by this device.

The advantage the device of the present invention has over the device shown in FIG. 5 is that the relatively high level of the first output signal is eliminated, although the trade-off is that the number of useable output signals is reduced somewhat. This enables the data processor used to have a narrower power band, and thus, to be made more accurate. In addition, protective circuitry on the output end is no longer required.

What is claimed is:

1. A fiber optic recirculating delay line, comprising:
    a first optical coupling device;
    a second optical coupling device;
    a first optical fiber extending through both of said coupling devices, said first fiber having two end portions and an intermediate portion, the first end portion extending from a first side of said first coupling device, the second end portion extending from a second side of said second coupling device, and said intermediate portion extending between a second side of said first coupling device and a first side of said second coupling device;
    a second optical fiber extending through both of said coupling devices, said second fiber having two end portions and a loop portion, the first end portion extending from the second side of said first coupling device, the second end portion extending from the first side of said second coupling device, and said loop portion extending between the first side of said first coupling device and the second side of said second coupling device, said coupling devices optically coupling said first and second optical fibers for transfer of light therebetween.

2. A fiber optic recirculating delay line as defined in claim 1, wherein said first optical coupling device comprises:
    means positioning said first optical fiber and said second optical fiber in side by side relationship to form a region of interaction in which guided modes of said first and second optical fibers interact through their evanescent fields to cause light to be transferred between the core portions of said first and second optical fibers.

3. A fiber optic recirculating delay line as defined in claim 2, wherein said second optical coupling device is identical to said first optical coupling device.

4. A fiber optic recirculating delay line as defined in claim 1, wherein said first optical fiber comprises:
    a single, continuous, splice-free length of optical fiber.

5. A fiber optic recirculating delay line as defined in claim 1, wherein said second optical fiber comprises:
    a single, continuous, splice-free length of optical fiber.

6. A fiber optic recirculating delay line as defined in claim 1, wherein said optical fibers are comprised of single mode optical fiber.

7. A fiber optic recirculating delay line as defined in claim 1, wherein the efficiency of said first and second optical coupling devices is greater than 50%.

8. A fiber optic recirculating delay line as defined in claim 1, wherein the efficiency of said first optical coupler is identical to the efficiency of said second optical coupler.

9. A fiber optic recirculating delay line as defined in claim 1, wherein the length of said loop portion of said second optical fiber
    is selected to provide a predetermined time delay for light propagating through said second optical fiber.

10. A fiber optic recirculating delay line as defined in claim 9, wherein said time delay is at least as long as the period of a signal to be stored in said recirculating delay line.

11. A fiber optic delay line comprising:
    a first optical fiber forming loop to provide a time delay light path for an optical signal recirculating therein;
    a second optical fiber, said first and second fibers juxtaposed for coupling therebetween and providing an input fiber portion and an output fiber portion for said delay line;
    said loop optically coupled to one of said fiber portions at a first location on said loop to input said recirculating optical signal to said loop; and
    said loop optically coupled to the other of said fiber portions at a second location on said loop to output said recirculating signal from said loop, said first location separate from said second location.

12. A fiber optic delay line having an input for receiving an input signal and an output for outputting an output signal, said delay line comprising:
    a fiber optic loop for time delaying a light signal circulating therein;
    a fiber optic segment;
    first means for optically coupling said loop and said segment, said first coupling means causing:
        a. a fraction of the optical power of said input signal to enter said segment; and
        b. a fraction of the optical power of said light signal circulating in said loop to enter said segment; and
    second means for optically coupling light from said delay line to provide said output signal, said second coupling means separate from said first coupling means, and causing:
        a. a fraction of the optical power of light in said segment to be directed to said output; and
        b. a fraction of the optical power of light in said segment into said loop.

13. A fiber optic delay line as defined in claim 12, wherein at least one of said fiber optic loop and said fiber optic segment comprise:
    a single mode optical fiber.

14. A fiber optic delay line as defined in claim 12, wherein said first and second means for coupling comprise portions of said loop and segment which are juxtaposed to couple light through interactions of the evanescent fields of light propagating therein.

15. A fiber optic recirculating memory device, comprising:

first and second optical fibers optically coupled to provide an input fiber portion for receiving an input light signal into said memory device a loop portion for recirculating said input light signal to provide a series of time delayed signals, a first output fiber portion for outputting said time delayed series of signals from said device, and a second output fiber portion for outputting a non-time delayed portion of said input signal from said device.

16. A fiber optic recirculating delay line for use as a filter to pass a fundamental modulation frequency and its harmonics, comprising:

a pair of optical fibers, juxtaposed for optional coupling to form a loop portion of said delay line, for recirculating and time delaying a fraction of a modulated input signal, said fibers additionally providing an input fiber portion for receiving said modulated input signal, a first output fiber portion for outputting a frequency filtered output signal, and a second output fiber portion for outputting a non-frequency filtered fraction of said input signal; and said loop portion having a length selected to provide a delay time for said delay line which is substantially equal to the period of said fundamental frequency, said delay line summing said input signal with the time delayed signal from said loop portion to attenuate said output signal for frequencies other than said fundamental frequency and its harmonics, but pass said output signal for said fundamental frequency and its harmonics.

17. A fiber optic recirculating delay line as defined in claim 16, wherein each of said optical fibers comprises: a length of single mode optical fiber.

18. A fiber optic recirculating delay line as defined in claim 16, wherein said juxtaposed optical fibers couple light through the interactions of evanescent fields.

19. A fiber optic recirculating memory device comprising:

a fiber optic delay line having a fiber loop portion, and input fiber portion, and an output fiber portion; and said input portion and said output portion coupled to said fiber loop portion at respective independent locations along said loop portion to cause a series of light pulses of identical waveform to be supplied to said output portion from a single input pulse, the number of said pulses of a usable level dependent upon the amount of coupling at both said locations and upon the loop loss in accordance with the following equation:

$$n = \frac{\ln \frac{P_T}{P_O} - \ln [(1 - l_1)(1 - l_2)]}{\ln (K\, l_1\, l_2)}$$

where n is the number of usable output pulses, $P_T/P_O$ is the ratio of the minimum detectable output power level to the power level of said light input, $l_1$ is a first coefficient of coupling, $l_2$ is a second coefficient of coupling, and K is the percentage of power transmitted by said loop between said coupling locations.

20. In a fiber optic delay line, a method of providing a series of output pulses of decreasing amplitude from a single input pulse, each of said series of pulses having an amplitude of at least $10^{-4}$ of said input pulse and being identical in waveform to said input pulse, comprising:

coupling input and output fiber portions of said delay line to a loop portion of said delay line at respective locations thereon; and selecting the coupling at said locations on said loop portion to yield a predetermined number of said output pulses from said single input pulse, the relationship between said coupling and the number of said output pulses determined by the formula $$n = \frac{\ln \frac{P_T}{P_O} - \ln [(1 - l_1)(1 - l_2)]}{\ln (K\, l_1\, l_2)}$$

where n is the number of said output pulses, $P_T/P_O$ is the ratio of the minimum detectable output power level to the power level of said light input, $l_1$ is a first coefficient of coupling, $l_2$ is a second coefficient of coupling, and K is the percentage of power transmitted by said delay line loop.

21. A recirculating delay line comprising: a length of optical fiber providing a delay; coupling means for:

a. supplying input light to said length of fiber;

b. supplying a plurality of output signals in a declining amplitude from a single input pulse, none of said signals being more than 50% larger than the next successive signal.

22. A fiber optic recirculating memory device, characterized by:

a first optical coupling device;

a second optical coupling device;

a first strand of optical fiber extending through said first optical coupling device and said second optical coupling device, said first strand having an input end, adjacent said first coupling device, for receiving an optical input signal and an output end, adjacent said second coupling device, for providing output signals; and a second strand of optical fiber having a first end extending through said first optical coupling device and a second end extending through said second optical coupling device, said second optical coupling device coupling a portion of said input optical signal propagating in said first strand into said second strand for propagation to said first optical coupling device, said first device coupling a portion of the optical signal propagating in said second strand into said first strand for providing a sequence of output signals at said output end which are substantially identical in waveform to the signal input to said input end.

23. A fiber optic recirculating memory device as defined in claim 22 wherein a predetermined delay time elapses between the coupling of an optical signal from said first strand into said second strand and the coupling of the same optical signal from said second strand into said first strand.

24. A fiber optic recirculating memory device as defined in claim 23 wherein the signal received at said input end has a predetermined signal duration and wherein the length of said second fiber is selected to provide a delay time which is greater than the signal duration.

25. A fiber optic recirculating memory device as defined in claim 24 wherein said first strand and said second strand are single mode optical fibers with said second strand being formed into a loop to provide the predetermined delay time.

26. A fiber optic recirculating memory device according to claim 25 wherein said first and second optical coupling devices use evanescent field coupling to couple light between said first and second strands.

27. A fiber optic recirculating memory device according to claim 26 wherein the first and second optical coupling devices have coupling efficiencies which are equal to each other.

28. A fiber optic recirculating memory device according to claim 27 wherein the signal from said output end is a sequence of pulses with the sequence including a number, n, of pulses having at least a predetermined signal level with n being calculated by the formula:

$$n = \frac{\ln \frac{P_T}{P_O} - \ln((1-l_1)(1-l_2))}{\ln(Kl_1 l_2)}$$

where $P_T/P_O$ is the ratio of the minimum detectable output power level to the power level of the light input, $l_1$ and $l_2$ are the coupling efficiencies of said first and second coupling devices, respectively, and K is the percentage of power transmitted by the second strand.

29. A fiber optic recirculating delay line, comprising:
an input fiber portion for receiving an optical input signal;
a loop fiber portion, optically coupled to receive a fraction of the signal input to said input fiber portion, and to recirculate at least a fraction of said input signal fraction to provide a series of time delayed optical signals;
a first output fiber portion, optically coupled to receive at least a fraction of said series of time delayed light signals from said loop portion, for providing a series of output signals; and
a second output fiber portion, optically coupled to receive a second fraction of the signal input to said input fiber portion, to prevent said second fraction from reaching said first output fiber portion and thereby reduce the difference in amplitude between successive ones of said series of output signals.

30. A method of producing a series of output signals utilizing a fiber optic delay line having an input and an output, said method comprising:
inputting an optical signal to the input of said delay line;
inputting a first portion of said input optical signal to a loop portion of said delay line;
recirculating at least a portion of said first optical signal portion in said loop portion to provide a series of optical signals;
outputting said series of signals from said loop portion at said delay line output; and
discarding a second input signal portion from said delay line to prevent it from reaching said delay line output.

31. In a fiber optic recirculating delay line for generating a series of optical output signals of declining amplitude at the output of said delay line from a single pulse input into the input of said delay line, a method of reducing the difference in amplitude between successive output signals, comprising:
discarding a portion of said input signal from said delay line to prevent said portion from reaching said delay line output to reduce the difference in amplitude between successive ones of said series of optical output signals of declining amplitude.

* * * * *